Patented Feb. 24, 1948

2,436,697

UNITED STATES PATENT OFFICE 2,436,697

SULFOFLUORIDES OF AZOIC DYESTUFFS

Hans Zacharias Lecher, Plainfield, Robert Prescott Parker, Somerville, and Corris Mabelle Hofmann, Bound Brook, N. J., assignors to American Cyanamid Company, New York, N. Y., a corporation of Maine No Drawing. Application July 31, 1944, Serial No. 547,515

13 Claims. (Cl. 260—204)

This invention relates to new water insoluble azo dyestuffs having fast shades of yellowish-orange to scarlet.

Azo dyestuffs which are water insoluble but capable of being used to dye cellulosic material are frequently referred to as ice colors and are derived from diazotized primary aromatic amines and coupling components both of which are free from water solubilizing groups such as sulfonic acid and carboxylic acid. Some of the most generally used coupling components are the aryl-amides of aromatic and heterocyclic ortho hydroxy carboxylic acids because they have satisfactory substantivity for cellulosic fibers. However, the range of colors obtainable is rather limited. For the most part only the heavier shades such as scarlets, reds, maroons, Bordeaux, and the like are readily obtainable. There are only a few primary aromatic amines which are capable of producing the lighter shades of yellowish-orange, orange and scarlet when diazotized and coupled with the aryl-amides of aromatic and heterocyclic ortho-hydroxy carboxylic acids. The choice is still further restricted because some of the few amines known are expensive, others are difficult to diazotize and apply and with others the colors produced have relatively poor fastness properties, particularly fastness to light and washing.

According to the present invention a new series of ice colors are obtained having shades from yellowish-orange to scarlet. These dyestuffs are producible at moderate cost and have good light and wash fastnesses. The dyes of the present invention are obtained by diazotizing primary amines of the benzene series which contain at least one sulfonyl fluoride group and coupling with aryl-amides of the aromatic and heterocyclic ortho-hydroxy carboxylic series. Accordingly in the specification and claims the term "aromatic" will be used in its common broad sense to mean ring compounds having conjugated double bonds, regardless of whether they are carbocyclic or heterocyclic. The benzene ring may also have other substituents which do not confer water solubility on the ice color produced. Typical substituents which may be present are alkyl, alkoxy, nitro, halogen, aralkoxy, aryloxy, sulfone groups, sulfonamide groups, beta-alkoxy-alkoxy, arylamino, trifluoromethyl, cyano groups.

The surprising discovery has been made that the sulfonyl fluoride group is so strongly hypsochromic that its presence in the nucleus of the amines of the benzene series permits the production of the important lighter shades. Sulfonyl halide groups are normally highly reactive and it is surprising that the sulfonyl fluoride groups in the present series of dyestuffs produce such stable compounds. It is not intended to limit the present invention to any theory, but it seems probable that the sulfonyl fluoride group in azo dyestuffs of the ice color type must behave entirely differently than do other sulfonyl halide groups.

It is an advantage of the present invention that the ice colors may be produced in the customary ways. No new techniques need be learned and no particular difficulties are encountered in diazotizing and coupling. It is possible to produce the dyestuffs of the present invention in the form of pigments or they may be formed on cellulosic material, the latter field being the more important one.

When producing pigments the procedure is to diazotize the amino-benzene sulfonyl fluorides and couple with the aryl-amides of aromatic and heterocyclic ortho-hydroxy carboxylic acids in the presence of an acid binding agent. The resultant pigment is then filtered off and in the dry powdered form the colors are from orange to scarlet and the pigments are insoluble in water. It is also possible to prepare the pigment in the presence of a substrate in order to extend it. The precipitation is effected in the conventional manner.

When the dyes of the present invention are to be used in dyeing cellulosic material the customary procedures are followed. Thus the goods may be first padded with an alkaline solution of the coupling component and the diazotized amino-benzene sulfonyl fluoride then applied. This application may be in the form of a developing bath in which a suitably buffered acid diazo solution is used to dye the padded cloth. If it is desired to print a design the buffered diazo solution is thickened with a suitable thickening gum to form a printing paste in the conventional manner and the paste is then printed on the padded cloth. Good, clear prints of excellent brilliance are obtainable.

The diazotized amino-benzene sulfonyl fluorides may also be transformed into the so-called fast color salts, for example by forming a solid zinc chloride double salt of the diazotized amine which may be dried, blended with alkali metal salts or metal salts, stored, and then dissolved to form developing baths or printing pastes in the customary manner.

Typical examples of amino-benzene sulfonyl fluorides which may be used to prepare dyes of the present invention include the following: 3-amino-benzene sulfonyl fluoride, 4-amino-benzene sulfonyl fluoride, 3-amino-4-methyl benzene sulfonyl fluoride, 3-amino-4-chlor benzene sulfonyl fluoride, 3-amino-4-methoxy benzene sulfonyl fluoride, 4-amino-5-nitrobenzene sulfonyl fluoride, 5-amino-benzene-1,3-disulfonyl fluoride, 2-N-4'-methoxy phenyl) amino-5-amino-benzene sulfonyl fluoride, 3-amino-4-trifluoro-methyl benzene sulfonyl fluoride, 3,3'-diamono-5,5'-difuosulfonyl diphenyl sulfone, 4-aminodiphenyl-2-sulfonyl fluoride and 2-phenoxy-5-amino-benzene sulfonyl fluoride.

Any of the known arylamides of aromatic or heterocyclic ortho-hydroxy carboxylic acids may be used as coupling components. These components are well known in the production of other ice colors. Some typical examples of useful ice color coupling components of this class are the arylamides of 2-hydroxy-3-naphthoic acid, of 2-hydroxy-3-anthroic acid, of methyl and dimethyl salicyclic acids, of 5,6,7,8-tetra hydro-2-hydroxy-3-naphthoic acid, of hydroxy-carbazol carboxylic acids and of hydroxy-benzocarbazol carboxylic acids. The arylamide group in the coupling component may be a simple aromatic group such as the radical of aniline or of its homologues, of an aniline derivative or of a naphthylamine, or it may be the radical of a heterocyclic amine such as, for example, of an amine of the benzothiazole series or of a diamine of the diphenylene oxide or diphenylene sulfone series. The invention will be more fully illustrated in conjunction with the following examples which are meant to be illustrative only and not by way of limitation. All parts are by weight unless otherwise noted.

*Example 1*

A solution of 3.7 parts of 3-amino-4-methyl benzene sulfonyl fluoride in 72 parts of water containing 18.8 parts of hydrochloric acid (1.19) is stirred to 5° C. and is diazotized by the addition of 1.4 parts of sodium nitrite dissolved in 20 parts of water.

One-eighth part of this solution is diluted with 300 parts of water, 150 parts of ice and 4 parts of sodium acetate are dissolved in the solution.

One part of the o-phenetidide of 2-hydroxy-3-naphthoic acid is pasted with 2 parts of methyl alcohol, treated with 2.5 parts of 20% sodium hydroxide and is diluted with 200 parts of water. Five parts of a cotton skein previously well wet out is entered and turned in this bath as the temperature is raised over a period of one-half hour to 45° C. The skein is turned at this temperature for an additional 15 minutes, is then removed and wrung out.

The cotton skein is now entered into the cold, buffered diazo bath prepared as described above and is continuously turned until full color has developed. The skein is removed from the diazo bath, is rinsed with fresh water, is treated in a 1% soap solution at 65° C., is rinsed with fresh water and is then dried.

The cotton skein is dyed a strong orange of brilliant yellow shade.

When instead of the o-phenetidide of 2-hydroxy-3-naphthoic acid, the following arylides are used to prepare the cotton skeins, the colors tabulated immediately following are obtained:

| Base | Coupling component | Color of skein dyeing |
|---|---|---|
| 3-amino-4-methyl benzene sulfonyl fluoride. | 2-hydroxy-3-naphthoic acid anilide. | Reddish orange. |
| Do | 2-hydroxy-3-naphthoic acid β-naphthylamide. | Scarlet. |
| Do | 2-hydroxy-3-naphthoic acid o-toluidide. | Orange. |
| Do | 2-hydroxy-3-naphthoic acid o-anisidide. | Yellowish orange. |
| Do | 2-hydroxy-3-naphthoic acid m-nitranilide. | Do. |
| Do | 2-hydroxy-3-naphthoic acid 2'-methyl-4'-chloroanilide. | Scarlet. |

*Example 2*

4.45 parts of 3-amino-4-methyl benzene sulfonyl fluoride are stirred in 50 parts of water containing 9.2 parts of hydrochloric acid (1.19) and are diazotized at low temperature by the addition of 1.64 parts of sodium nitrite dissolved in 5 parts of water. The diazo solution so prepared is diluted to 75 parts by volume.

8 parts by volume of this diazo solution are diluted with 12 parts of water, treated with 10 parts of 5% sodium acetate solution and 70 parts of a suitable carbohydrate thickener. This paste is printed from an engraved roll of cotton piece goods which has been previously impregnated with 2-hydroxy-3-naphthoic acid anilide in an alkaline solution. The print so obtained is dried, rinsed in cold water and is treated in ½% soap solution at 65° C. for 10 minutes. The print is then rinsed in fresh water and dried. An orange pattern of reddish shade is obtained.

When in place of the anilide of 2-hydroxy-3-naphthoic acid, cotton cloth is impregnated with the following arylides, colored patterns are obtained as indicated below:

| Base | Coupling component | Color of pattern |
|---|---|---|
| 3-amino-4-methyl benzene sulfonyl fluoride. | 2-hydroxy-3-naphthoic acid β-naphthylamide. | Scarlet. |
| Do | 2-hydroxy-3-naphthoic acid o-toluidide. | Orange. |
| Do | 2-hydroxy-3-naphthoic acid o-phenetidide. | Yellowish orange. |
| Do | 2-hydroxy-3-naphthoic acid o-anisidide. | Do. |
| Do | 2-hydroxy-3-naphthoic acid m-nitranilide. | Do. |
| Do | 2-hydroxy-3-naphthoic acid 2'-methyl-4'-chloroanilide. | Scarlet. |
| Do | 2-hydroxy-3-naphthoic acid 4'-chloroanilide. | Do. |

*Example 3*

9.5 parts of 3-amino-4-methyl benzene sulfonyl fluoride are dissolved in 100 parts of water containing 25 parts of hydrochloric acid (1.19) and at low temperature the solution is diazotized by the addition of 3.5 parts of sodium nitrite dissolved in 15 parts of water. The diazo solution so obtained is clarified and is treated with 17 parts of zinc chloride as a 50% solution whereupon the zinc chloride double salt of the diazonium chloride partially separates as a white, crystalline solid. 25 parts of common salt are added and the precipitated material is separated off by filtration. After drying at low temperature, 1.3 parts of this product are intimately mixed with 4.5 parts of aluminum sulfate octahydrate.

3 parts of this color blend are diluted with 25 parts of water and the solution is treated with 2 parts of 50% acetic acid and 70 parts of a suitable carbohydrate thickener. This paste is printed according to the procedure described in Example 2 on cotton piece goods previously impregnated with the o-phenetidide of 2-hydroxy-3-naphthoic acid in an alkaline solution. When finished, the cloth is printed a brilliant yellowish shade of orange.

When the o-anisidide of 2-hydroxy-3-naphthoic acid is substituted for the o-phenetidide, a bright orange of slightly redder shade is obtained.

Example 4

To a solution of 44.4 parts of potassium fluoride in 50 parts of water which is efficiently agitated are added 124.7 parts of 3-nitro-4-chlorobenzene sulfonyl chloride. The reaction mixture is stirred at 130°–135° C. for 2½ hours, is cooled to room temperature, is diluted with 175 parts of water and the crude 3-nitro-4-chlorobenzene sulfonyl fluoride is extracted with ether. After washing the ether extract with 2% aqueous sodium hydroxide solution and then with water, the extract is dried with anhydrous sodium sulfate, is filtered and the ether is removed by distillation. The residue is distilled under reduced pressure; 3-nitro-4-chlorobenzene sulfonyl fluoride distilling at 138°–140° C. at 5 mm. of mercury pressure. The distillate solidifies, the pure product melting at 58°–60° C.

62.2 parts of 3-nitro-4-chlorobenzene sulfonyl fluoride in 208 parts of hydrochloric acid (1.19) are treated at 35°–40° C. portionwise with 72 parts of tin. When reduction is complete, the tin double salt of 3-amino-4-chlorobenzene sulfonyl fluoride is filtered off. The residue is stirred in 1000 parts of water and the slurry is treated at 0°–5° C. with soda ash until the solution is basic to brilliant yellow test paper. The resulting slurry is extracted with ether, the ether extract is dried over sodium sulfate and after filtration the ether is removed by distillation. The residual 3-amino-4-chlorobenzene sulfonyl fluoride may be further purified by crystallization from dilute alcohol solution and when pure melts at 64°–66° C.

Example 5

A mixture of 15.6 parts of 3-amino-4-chlorobenzene sulfonyl fluoride, 25 parts of hydrochloric acid (1.19) and 50 parts of water is boiled until the base dissolves. The solution is cooled to 0° C. and 5.2 parts of sodium nitrite dissolved in 30 parts of water are added to complete diazotization. After clarification of the diazo solution, 25.5 parts of zinc chloride as a 50% solution, and 25 parts of sodium chloride respectively are added. The zinc chloride double salt of the diazonium chloride which separates from solution is collected on the filter and the residue is dried at low temperature.

1.35 parts of the zinc chloride double salt of the diazonium chloride are well mixed with 3.7 parts of aluminum sulfate octahydrate.

2 parts of this color blend are dissolved in 28 parts of water and are treated with 70 parts of suitable carbohydrate thickener. This color paste is printed from an engraved roll on cotton piece goods previously impregnated with the anilide of 2-hydroxy-3-naphthoic acid in an alkaline bath. The print is dried, is rinsed in fresh water and is treated at 65° C. in a ½% soap solution. The print is finished by rinsing and drying. An even pattern of scarlet color is obtained.

When, instead of the anilide, prints are made on cotton piece goods previously impregnated with the o-phenetidide or the o-anisidide of 2-hydroxy-3-naphthoic acid, bright orange patterns are obtained.

Example 6

4.2 parts of 3-amino benzene sulfonyl fluoride hydrochloride are dissolved in 45 parts of water containing 14.5 parts of hydrochloric acid (1.19) and at low temperature the solution is diazotized by addition of 1.4 parts of sodium nitrite dissolved in 15 parts of water. One-eighth part of this diazo solution is diluted with 300 parts of water, 150 parts of ice, and is treated with 20 parts of 20% sodium acetate solution.

5 parts of a cotton skein are well wet out in 1% soap solution and are well rinsed in fresh water. The skein is then immersed in a solution containing one part of the ortho-anisidide of 2-hydroxy-3-naphthoic acid, 3 parts of methyl alcohol, 5 parts of 20% sodium hydroxide solution and 400 parts of water. While turning the skein, the temperature of this bath is raised to 45° C. and the skein is turned at this temperature for a period of ½ hour. The skein is removed, is wrung out and is then turned in the buffered diazo bath until color is fully developed. After finishing, the skein is levelly dyed a bright orange of yellowish shade.

Tabulated immediately below are colors obtained by substituting some other arylides of 2-hydroxy-3-naphthoic acid for the 2-hydroxy-3-naphthoic acid o-anisidide, as described:

| Base | Coupling component | Color of dyeing |
|---|---|---|
| 3-amino benzene sulfonyl fluoride. | 2-hydroxy-3-naphthoic acid anilide. | Orange. |
| Do | 2-hydroxy-3-naphthoic acid β-naphthylamide. | Scarlet. |
| Do | 2-hydroxy-3-naphthoic acid o-toluidide. | Orange. |
| Do | 2-hydroxy-3-naphthoic acid m-nitranilide. | Yellowish orange. |
| Do | 2-hydroxy-3-naphthoic acid o-phenetidide. | Do. |
| Do | 2-hydroxy-3-naphthoic acid 2'-methyl-4'-chloroanilide. | Scarlet. |
| Do | 2-hydroxy-3-naphthoic acid 4'-chloroanilide. | Orange. |
| Do | 2-hydroxy-3-carbazole carboxylic acid-(2'-methyl anilide). | Yellow-brown. |

Example 7

3.2 parts of 3-amino benzene sulfonyl fluoride hydrochloride are dissolved in 30 parts of water containing 3 parts of hydrochloric acid (1.19) and at 0° C. are diazotized by the addition of 1 part of sodium nitrite dissolved in 6 parts of water. The diazo solution is clarified and a 50% solution of zinc chloride containing 5.2 parts of zinc chloride is added. The zinc chloride double salt of the diazonium chloride partially separates as a white crystalline solid which is further salted out by the addition of 10 parts of sodium chloride. The precipitate is filtered off and is dried at low temperature. 1.3 parts of this product are intimately mixed with 3.9 parts of aluminum sulfate octahydrate.

4 parts of this color blend are dissolved in 26 parts of water and are thickened by the addition of 70 parts of carbohydrate thickener. The color paste is printed on cotton piece goods previously impregnated in an alkaline solution with the anilide of 2-hydroxy-3-naphthoic acid. The print is dried, is rinsed in fresh water, is treated in ½% soap solution at 65° C., is rinsed in fresh water

Example 8

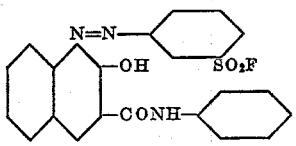

5 parts of 3-amino benzene sulfonyl fluoride hydrochloride are stirred in 80 parts of water and are dissolved by adding 4.7 parts of hydrochloric acid (1.19). At 0° C., the solution is diazotized by the addition of 1.7 parts of sodium nitrite dissolved in 10 parts of water.

6.6 parts of 2-hydroxy-3-naphthoic acid anilide are pasted in 1 part of methyl alcohol and then a solution containing 3.5 parts of sodium hydroxide dissolved in 10 parts of water is added. After stirring, 100 parts of water are added and the resulting solution is cooled down to 5° C. The diazo solution as prepared above is entered rapidly and stirring is maintained until coupling is complete. The precipitated pigment is filtered and is well washed on the filter with 10% brine solution. The filter cake is reslurried in cold ½% sodium chloride solution and is then refiltered. The dyestuff melts at 207°–210° C.

Example 9

A 47% solution of potassium fluoride is prepared by dissolving 44.4 parts of potassium fluoride in 50 parts of water and to this solution 124 parts of 4-acetylamino benzene sulfonyl chloride are added portionwise with efficient agitation. 100 parts of water are added to the reaction mixture which is then heated at 135°–140° C. for 2½ hours. After cooling the reaction mixture to 80° C., 200 parts of water are added and the reaction mixture is then stirred down to a temperature of 10° C. The solid which forms is filtered off and is well washed on the filter with cold water. The crude 4-amino benzene sulfonyl fluoride may be purified by crystallization from dilute hydrochloric acid and the free base may be liberated by treating a dilute hydrochloric acid solution with an alkaline carbonate. 4-amino benzene sulfonyl fluoride melts at 68°–69° C.

Example 10

8.8 parts of 4-amino benzene sulfonyl fluoride are dissolved in 100 parts of water by the addition of 25 parts of hydrochloric acid (1.19) and at low temperature are diazotized by the addition of 3.5 parts of sodium nitrite dissolved in 15 parts of water. The diazo solution so obtained is clarified and at 0° C. is treated with 17 grams of zinc chloride as a 50% solution. The solution is then treated with 25 grams of sodium chloride and the precipitated zinc chloride double salt of the diazonium chloride is separated by filtration. It is dried at low temperature.

1.35 parts of the zinc chloride double salt of the diazonium chloride are intimately mixed with 2.73 parts of aluminum sulfate octahydrate and 1.36 parts of sodium sulfate.

4 parts of this color blend are dissolved in 26 parts of water and are treated with 70 parts of carbohydrate thickener. This color paste is printed from an engraved roll on cotton cloth previously impregnated with the anilide of 2-hydroxy-3-naphthoic acid in alkaline solution. The print is dried, is rinsed in fresh water, is treated at 65° C. in a ½% soap solution, is rinsed and is dried. An even orange pattern of reddish shade is obtained.

Example 11

9.2 parts of 3-amino-4-methoxy benzene sulfonyl fluoride in 90 parts of water containing 13.5 parts of hydrochloric acid (1.19) are stirred to 0° C. and are diazotized by the addition of 3.1 parts of sodium nitrite dissolved in 18 parts of water. After clarification, the diazo solution is treated with 18.3 parts of zinc chloride as a 50% solution. 24.0 parts of sodium chloride are added and the white, crystalline precipitate is filtered off and dried at low temperature.

1.3 parts of the diazonium chloride-zinc chloride double salt and 4.96 parts of aluminum sulfate octahydrate are intimately mixed.

4 parts of this color blend are dissolved in 26 parts of water and treated with 70 parts of carbohydrate thickener. The print paste is printed on cotton piece goods from an engraved roll according to the procedure described above in Example 10, the cotton piece goods being previously impregnated with the anilide of 2-hydroxy-3-naphthoic acid. After finishing, a bright scarlet pattern is obtained.

Example 12

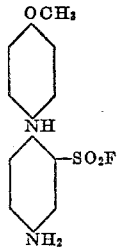

1 part of 2-(N-4'-methoxy phenyl) amino-5-amino benzene sulfonyl fluoride is stirred in 8 parts of water and 1.8 parts of hydrochloric acid (1.19) are added. The temperature is adjusted at 15° C. and the mixture is diazotized by the slow addition of 0.22 part of sodium nitrite dissolved in 3 parts of water. The resultant brown solution is clarified and the filtrate is treated with 7.5 grams of common salt. While stirring at low temperature, a 50% solution of zinc chloride is dropped in to complete precipitation. The orange solid which precipitates is filtered and is washed on the filter with cold 10% salt solution. This zinc chloride double salt of the nitroso-diazonium chloride is dried at 40° C., yielding an orange solid which is readily soluble in water.

1 part of the zinc chloride double salt of the nitroso-diazonium chloride obtained as described above is dissolved in 100 parts of water and while agitating the solution efficiently, 5 parts of cotton piece goods previously impregnated in alkaline solution with the o-toluidide of 2-hydroxy-3-naphthoic acid are entered into this bath. The cotton piece goods is agitated until color is fully developed, a deep maroon shade being produced.

One-half of the dyed cotton piece goods is boiled in a ½% soap solution for 5 minutes, is then rinsed and dried. A deep Bordeaux dyeing results. The other half of the above-dyed cotton is boiled in a 2½% sodium carbonate solution containing ¼% of sodium sulfide. The dyeing is rinsed with cold water and is dried. The cloth is evenly dyed a blue of reddish shade.

The 2-(N-4'-methoxy phenyl) amino-5-amino benzene sulfonyl fluoride employed above is prepared by the following procedure:

52.0 parts of sodium 2-(N-4'-methoxy phenyl) amino-5-nitro benzene sulfonate are added portionwise with stirring to a cold solution of 39.0 parts phosphorous pentachloride in 130 parts of phosphorous oxychloride. When all added, the temperature is raised during one hour to 90° C. at which time the phosphorous oxychloride is distilled off under reduced pressure. Cold water is added to the residue, and after stirring, the crude 2-(N-4'-methoxy phenyl) amino-5-nitro benzene sulfonyl chloride filtered off. It may be further purified by crystallization from benzene or ether-benzene mixture and when pure melts at 140.5°–141.5° C.

15.8 parts of this product are heated and stirred under a reflux condenser to 110° C., treated with 7.5 parts of monochlorobenzene and a solution containing 17.3 parts of potassium fluoride dihydrate in 6.4 parts of water is added. The temperature is maintained at 120° C. for 2 hours longer, the reaction mixture is then cooled to 10° C. and 50 parts of water are added. At 0° C. a mixture of 13 parts benzene and 7.0 parts ether is added and the precipitated solid is filtered off. 2-(N-4'-methoxy phenyl) amino-5-nitro benzene sulfonyl fluoride may be rendered pure by crystallization from a mixture of benzene and ether and melts at 131.5°–132.5° C.

8.7 parts of this product are stirred in 100 parts of hydrochloric acid (1.19) and 18.0 parts of tin are added portionwise as the temperature is slowly raised to 40° C. Reduction is completed at 70° C. and after chilling, the tin double salt is filtered off. This residue is slurried in 200 parts of water and at low temperature soda ash is added until the solution is basic to Congo red test paper. The amine is extracted with ether, the ether layer is dried over sodium sulfate, is filtered and the hydrochloride of 2-(N-4'-methoxy-phenyl) amino-5-amino benzene sulfonyl fluoride is precipitated by passing in dry hydrogen chloride. It is filtered off and dried at low temperature. The free base may be liberated by neutralizing a water solution with alkaline carbonates.

We claim:

1. Water insoluble azo colors having the following formula:

$$A-N=N-B$$

in which A is the residue of a diazotized amino benzene sulfonyl fluoride and B is the residue of an aryl-amide of an aromatic ortho-hydroxy carboxylic acid, both A and B being free from water solubilizing groups.

2. Water insoluble azo colors having the following formula:

$$A-N=N-B_1$$

in which A is the residue of a diazotized amino benzene sulfonyl fluoride and $B_1$ is the residue of an aryl-amide of a carboxylic aromatic ortho-hydroxy carboxylic acid, both A and $B_1$ being free from water solubilizing groups.

3. Water insoluble azo colors having the following formula:

$$A-N=N-BHN$$

in which A is the residue of a diazotized amino benzene sulfonyl fluoride and BHN is the residue of an aryl-amide of 2-hydroxy-3-naphthoic acid, both A and BHN being free from water solubilizing groups.

4. Water insoluble azo colors having the following formula:

$$A_1-N=N-B$$

in which $A_1$ is the residue of a diazotized amino benzene monosulfonyl fluoride and B is the residue of an aryl-amide of an aromatic ortho-hydroxy carboxylic acid, both $A_1$ and B being free from water solubilizing groups.

5. Water insoluble azo colors having the following formula:

$$A_1-N=N-B_1$$

in which $A_1$ is the residue of a diazotized amino benzene monosulfonyl fluoride and $B_1$ is the residue of an aryl-amide of a carbocyclic aromatic ortho-hydroxy carboxylic acid, both $A_1$ and $B_1$ being free from water solubilizing groups.

6. Water insoluble azo colors having the following formula:

$$A_1-N=N-BHN$$

in which $A_1$ is the residue of a diazotized amino benzene monosulfonyl fluoride and BHN is the residue of an aryl-amide of 2-hydroxy-3-napthoic acid, both $A_1$ and BHN being free from water solubilizing groups.

7. An azo coloring matter having the following formula:

[Structural formula: naphthalene ring with N=N linkage to benzene ring bearing SO₂F, with OH and CONH- groups, connected to phenyl ring with OCH₃]

8. An azo coloring matter having the following formula:

[Structural formula: naphthalene ring with N=N linkage to benzene ring bearing CH₃ and SO₂F, with OH and CONH- groups, connected to phenyl ring with OC₂H₅]

9. An azo coloring matter having the following formula:

[Structural formula: naphthalene ring with N=N linkage to benzene ring bearing SO₂F, with OH and CONH- groups, connected to phenyl ring]

10. A method of preparing water insoluble azo colors which comprises diazotizing an amino benzene sulfonyl fluoride free from water solubilizing groups and coupling it with an aryl-amide of an aromatic ortho-hydroxy carboxylic acid the amide being free from water soluble groups.

11. A method of preparing water insoluble azo colors which comprises diazotizing an amino benzene sulfonyl fluoride free from water solubilizing groups and coupling it with an aryl-amide of a carboxylic aromatic ortho-hydroxy carboxylic acid the amide being free from water solubilizing groups.

12. A method of preparing insoluble azo colors which comprises diazotizing an amino benzene sulfonyl fluoride free from water solubilizing groups and coupling it with an aryl-amide of 2- hydroxy-3-naphthoic acid the amide being free from water solubilizing groups.

13. A material containing fibers free from basic nitrogenous groups dyed with an azo dye of claim 1.

HANS ZACHARIAS LECHER.
ROBERT PRESCOTT PARKER.
CORRIS MABELLE HOFMANN.

REFERENCES CITED

The following references are of record in the file of this patent:

UNITED STATES PATENTS

| Number | Name | Date |
|---|---|---|
| 2,154,186 | Schweitzer et al. | Apr. 11, 1939 |
| Re. 19,527 | Laska et al. | Apr. 9, 1935 |
| 1,914,427 | Heyna | June 20, 1933 |
| 1,929,328 | Muller | Oct. 3, 1933 |
| 2,013,723 | Zwilgmeyer | Sept. 10, 1935 |
| 2,025,582 | Fischer | Dec. 24, 1935 |

FOREIGN PATENTS

| Number | Country | Date |
|---|---|---|
| 155,073 | Australia | Nov. 25, 1938 |